United States Patent
Yanai et al.

(10) Patent No.: US 7,948,593 B2
(45) Date of Patent: May 24, 2011

(54) PROJECTOR HAVING AN ADJUSTMENT MECHANISM

(75) Inventors: Hiroaki Yanai, Shiojiri (JP); Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 12/049,643

(22) Filed: Mar. 17, 2008

(65) Prior Publication Data

US 2008/0231766 A1 Sep. 25, 2008

(30) Foreign Application Priority Data

Mar. 23, 2007 (JP) ................................. 2007-076113
Mar. 11, 2008 (JP) ................................. 2008-060673

(51) Int. Cl.
*G02F 1/1335* (2006.01)

(52) U.S. Cl. .......................................... 349/119; 349/8

(58) Field of Classification Search .................... 349/18, 349/117–121, 5–10
See application file for complete search history.

(56) References Cited

U.S. PATENT DOCUMENTS

| | | | |
|---|---|---|---|
| 5,194,975 A | 3/1993 | Akatsuka et al. | |
| 5,369,513 A | 11/1994 | Akatsuka et al. | |
| 5,406,396 A | 4/1995 | Akatsuka et al. | |
| 5,504,603 A * | 4/1996 | Winker et al. | ................ 349/117 |
| 5,523,867 A | 6/1996 | Akatsuka et al. | |
| 5,650,833 A | 7/1997 | Akatsuka et al. | |
| 5,923,392 A | 7/1999 | Akatsuka et al. | |
| 5,995,184 A * | 11/1999 | Chung et al. | ................ 349/118 |
| 6,650,386 B1 | 11/2003 | Shimoshikiryoh | |
| 6,784,961 B2 | 8/2004 | Suzuki et al. | |
| 6,885,422 B2 | 4/2005 | Suzuki et al. | |
| 6,985,198 B2 | 1/2006 | Kume et al. | |
| 7,030,951 B2 | 4/2006 | Suzuki et al. | |
| 7,114,811 B2 | 10/2006 | Arai et al. | |
| 7,274,419 B2 | 9/2007 | Tashiro et al. | |
| 7,327,424 B2 | 2/2008 | Shimoshikiryoh | |
| 7,630,039 B2 | 12/2009 | Tashiro et al. | |
| 2004/0257506 A1 | 12/2004 | Tashiro et al. | |
| 2006/0050215 A1 | 3/2006 | Haruyama | |
| 2006/0221286 A1 * | 10/2006 | Allen et al. | ................... 349/121 |
| 2007/0040970 A1 * | 2/2007 | Yoshioka et al. | ............. 349/117 |
| 2007/0070276 A1 * | 3/2007 | Tan et al. | ....................... 349/117 |
| 2007/0182894 A1 | 8/2007 | Nakagawa et al. | |
| 2008/0278668 A1 | 11/2008 | Haruyama | |

FOREIGN PATENT DOCUMENTS

JP A-02-308128 12/1990

(Continued)

*Primary Examiner* — Mark A Robinson
*Assistant Examiner* — Michael Inadomi
(74) *Attorney, Agent, or Firm* — Oliff & Berridge, PLC (57) ABSTRACT

A projector includes: an optical modulator including a liquid crystal cell, a first optical element formed of an optical material having positive uniaxiality, a second optical element formed of an optical material having positive uniaxiality, a third optical element including at least one optical film formed of optical material having a refractive index anisotropy, and a pair of polarization elements; an adjustment mechanism that can adjust an optical azimuth of a first group, having at least one of the first optical element, second optical element, and at least one optical film included in the third optical element, with respect to a fixed optical azimuth of a second group as a remainder excluding the element included in the first group among the first to third optical elements; a light source generating light for illuminating the optical modulator; and a projection optical system projecting the light passed through the optical modulator.

9 Claims, 8 Drawing Sheets

FOREIGN PATENT DOCUMENTS

| | | |
|---|---|---|
| JP | A-2000-066196 | 3/2000 |
| JP | A-2002-014345 | 1/2002 |
| JP | A-2002-182213 | 6/2002 |
| JP | A-2003-270636 | 9/2003 |
| JP | A-2004-054216 | 2/2004 |
| JP | A-2004-177951 | 6/2004 |
| JP | A-2004-198650 | 7/2004 |
| JP | A-2005-055455 | 3/2005 |
| JP | A-2005-114918 | 4/2005 |
| JP | A-2005-292781 | 10/2005 |
| JP | A-2006-078637 | 3/2006 |
| JP | A-2006-215127 | 8/2006 |

* cited by examiner

PROJECTOR HAVING AN ADJUSTMENT MECHANISM

BACKGROUND

1. Technical Field

The present invention relates to a projector incorporating a liquid crystal device for image formation.

2. Related Art

As a liquid crystal projector in the past, there is a liquid crystal projector employing a twist nematic liquid crystal panel. In the liquid crystal projector, two optical elements for compensation including uniaxial elements having optical axes, which orient a rubbing direction and tilt by a predetermined angle with respect to an incidence surface, are arranged between the liquid crystal panel and an incident side polarizer and between the liquid crystal panel and an emitting side polarizer (see JP-A-2004-198650). In such a liquid crystal projector, it is possible to compensate for a pre-tilt of a liquid crystal by adjusting the optical axes and the thickness of the optical elements for compensation arranged near the liquid crystal panel. Hence it is possible to improve a contrast.

However, when, for example, inexpensive crystal plates having high workability are adopted as the uniaxial optical anisotropic elements described above, it is possible to improve a contrast near a front direction. However, there is a limit in compensation concerning obliquely incident light. Therefore, a sufficient viewing angle characteristic is not obtained.

SUMMARY

For compensation concerning obliquely incident light, it is conceivable to add an optical film or the like having an anisotropy approximated to negative uniaxiality besides the two crystal plates for improvement of a contrast. However, adjustment of the optical elements is complicated because a number of the optical elements for compensation are increased. It is difficult to adjust rotating positions of the three optical elements described above because of a space for an adjustment mechanism and complexity of an adjustment process. Since there are the plural optical elements for compensation between the liquid crystal panel and a projection lens, if adjustment mechanisms are individually provided for the optical elements, a back focus of the projection lens is extended and design of the projection lens is limited.

Therefore, an advantage of some aspects of the invention is to provide a projector that can realize a satisfactory contrast and a satisfactory viewing angle characteristic through simple adjustment.

According to an aspect of the invention, there is provided a projector including an optical modulator including a liquid crystal cell that includes a liquid crystal operating in a twist nematic mode, a first optical element formed of an optical material having positive uniaxiality, a second optical element formed of an optical material having positive uniaxiality, a third optical element that includes at least one optical film formed of an optical material having a refractive index anisotropy, and a pair of polarization elements between which the liquid crystal cell and the first to third optical elements are disposed, an adjustment mechanism that makes it possible to adjust an optical azimuth of a first group, which has at least one of the first optical element, the second optical element, and at least one optical film included in the third optical element, with respect to a fixed optical azimuth of a second group as a remainder excluding the element included in the first group among the first to third optical elements, a light source that generates light for illuminating the optical modulator, and a projection optical system that projects the light that has passed through the optical modulator.

In the projector, it is possible to effectively compensate for, with the third optical element, a refractive index characteristic of positive uniaxiality remaining in the optical compensation by the first and second optical elements and extending in a normal direction of an incidence surface and an emission surface. In compensating for the refractive index characteristic, the optical azimuth of the first group, which has at least one of the first optical element, the second optical element, and at least one optical film among optical films included in the third optical films, can be adjusted with respect to the fixed optical azimuth of the second group as the remainder by the adjustment mechanism. Thus, it is possible to reduce a residual retardation of the optical modulator concerning an adjustment reference direction at an angle with respect to a polarization direction of the pair of polarization elements.

According to an aspect of the invention, in the projector, the first group has at least one optical film included in the third optical element. In this case, it is possible to reduce, according to adjustment of a rotating position of the optical film that is relatively less affected by the adjustment, the residual retardation of the optical modulator concerning the adjustment reference direction at an angle with respect to the polarization direction of the pair of polarization elements.

According to another aspect of the invention, the first group is rotatable around an axis parallel to a system optical axis by the adjustment mechanism. In this case, it is possible to easily and effectively adjust relative positions of optical azimuths in planes perpendicular to the system optical axis of the first to third optical elements that affect polarized light made incident from a direction parallel to the system optical axis.

According to still another aspect of the invention, the first optical element is included in the first group and the second optical element is included in the second group. In this case, since the first group includes the first optical element that has a retardation equal to or larger than a fixed value that affects the polarized light made incident from the direction parallel to the system optical axis, it is possible to design a moving range of the adjustment mechanism small. When the retardation is small, fine adjustment by the adjustment mechanism is easy because an amount of change is small even if the adjustment mechanism is rotated. Conversely, when the retardation is large, it is possible to design a rotation range of the adjustment mechanism narrow because an amount of change is large. The optical film or the like as the third optical element usually has a small retardation in the front direction compared with those of the first and second optical elements.

According to still another aspect of the invention, when a plurality of the optical films are included in the third optical element, the optical films included in the third optical element are distributed to the first and second groups such that a difference between the number of optical films included in the first group and the number of optical films included in the second group is minimized. In this case, it is possible to set a retardation that affects the polarized light made incident from the direction parallel to the system optical system due to the optical azimuth of the first group and a retardation that affects the polarized light made incident from the direction parallel to the system optical axis due to the optical azimuth of the second group relatively close to each other. It is possible to set a relatively small residual retardation that affects the polarized light made incident at a predetermined angle to the system optical axis remaining after adjustment of a relative position for the optical azimuth in the plane perpendicular to the system optical axis of the first group with respect the optical azimuth in the plane perpendicular to the system optical axis of the second group.

According to still another aspect of the present invention, the first optical element and the second optical element are included in one of the first group and the second group. In this case, since both the pair of optical elements having positive uniaxiality are included in one of the groups, it is possible to perform fine adjustment by reducing an amount of adjustment of a phase by the adjustment mechanism. In manufacturing the first optical element and the second optical element, when a manufacturing process includes chemical reaction such as an etching process, by arranging the first optical element and the second optical element on both sides of one element, it is possible to perform, at a time, thin film formation for forming the respective optical elements with desired thickness and realize simplification of a manufacturing process.

According to still another aspect of the invention, the optical film included in the third optical element is a stretched film. In this case, since a relatively inexpensive stretched film is incorporated in the third optical element to perform optical compensation, it is possible to manufacture the optical modulator as well as the third optical element at relatively low cost.

According to still another aspect of the invention, the first and second optical elements are crystal plates, respectively. In this case, it is possible to relatively precisely set amounts of phase adjustment by the first and second optical elements while securing stability and strength of the first and second optical elements.

According to still another aspect of the invention, the first and second optical elements have thicknesses for cooperating to effectively cancel components in a plane parallel to the incidence surface and the emission surface in retardation of liquid crystal due to a liquid crystal present near the incidence surface and the emission surface in the liquid crystal cell. The third optical element has thickness for effectively canceling components in a direction perpendicular to the incidence surface and the emission surface in the retardation of liquid crystal and canceling concomitant retardation concerning the direction perpendicular to the incidence surface and the emission surface due to the first and second optical elements. In this case, it is possible to surely reduce retardation not only in the front direction of the liquid crystal cell but also in a wide range including the vicinity of the front direction of the liquid crystal cell and improve a quality of an image formed by a liquid crystal device.

BRIEF DESCRIPTION OF THE DRAWINGS

The invention will be described with reference to the accompanying drawings, wherein like numbers reference like elements.

FIG. 12 is a diagram for explaining an optical system of a projector incorporating the liquid crystal light valve shown in FIG. 1 and the like.

DESCRIPTION OF EXEMPLARY EMBODIMENTS

First Embodiment

Figure 1:
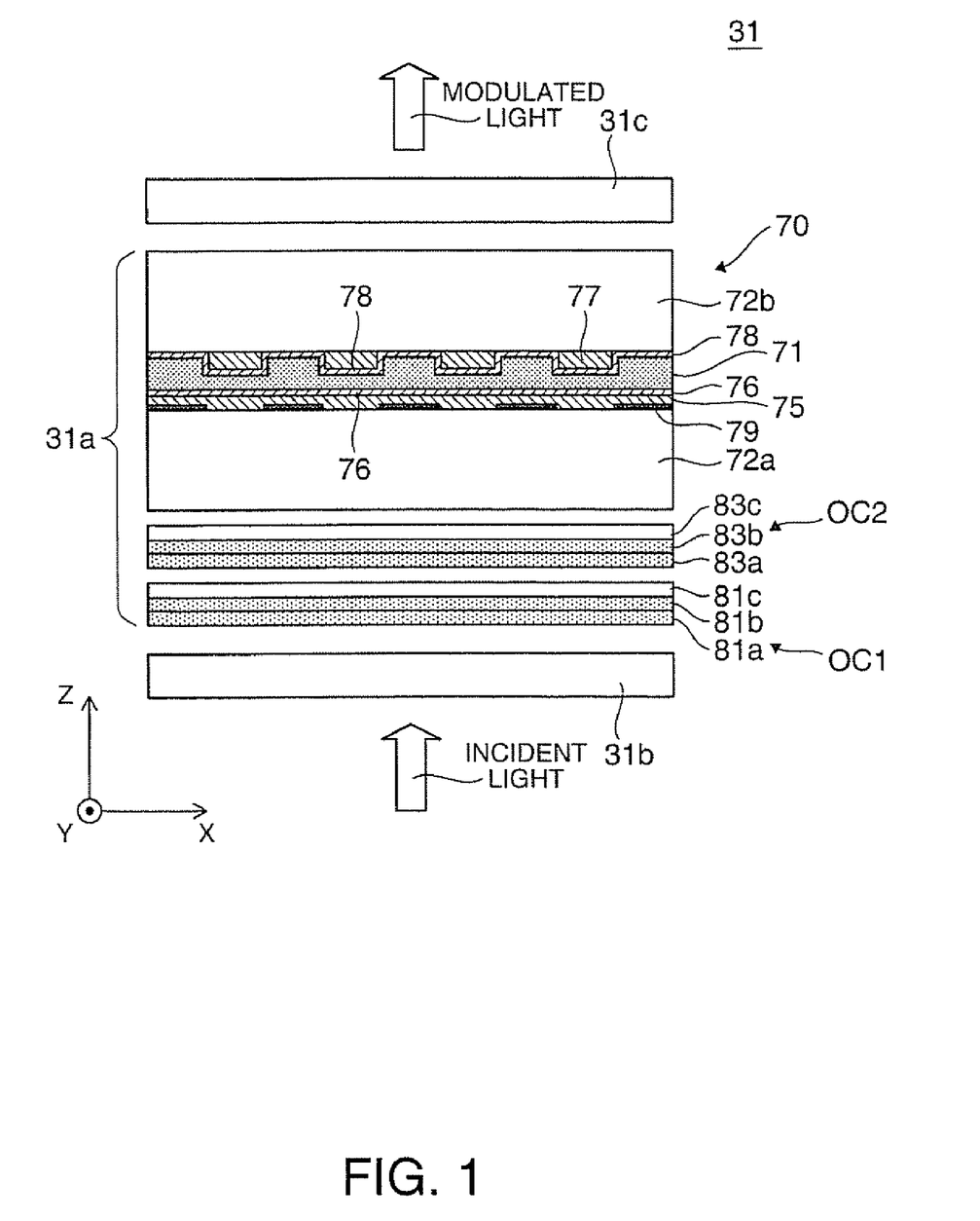
FIG. 1 is a side sectional view for explaining the structure of a liquid crystal light valve according to a first embodiment of the invention.

FIG. 1 is an enlarged sectional view for explaining the structure of a liquid crystal light valve (a light modulator) as a liquid crystal device according to a first embodiment of the invention.

In a liquid crystal light valve 31 shown in the figure, a first polarization filter 31b as a polarization element on an incidence side and a second polarization filter 31c as a polarization element on an emission side constitute Crossed Nicols. A polarized-light modulating unit 31a between the first and second polarization filters 31b and 31c is a liquid crystal panel that changes a polarization direction of incident light in pixel units according to an input signal.

The polarized-light modulating unit 31a has a liquid crystal cell 70 including a transparent first substrate 72a on an incidence side and a transparent second substrate 72b on an emission side across a liquid crystal layer 71 including a liquid crystal that operates in a twist nematic mode (i.e., a twist nematic liquid crystal). The polarized-light modulating unit 31a has a first optical compensation member OC1 and a second optical compensation member OC2 on the first polarization filter 31b side of the liquid crystal cell 70. The substrates 72a and 72b and the optical compensation members OC1 and OC2 are arranged in the same manner as the polarization filters 31b and 31c such that normals of the incidence and emission surfaces are parallel to a Z axis.

In the liquid crystal cell 70, a transparent common electrode 75 is provided on a surface on the liquid crystal layer 71 side of the first substrate 72a. On the common electrode 75, for example, an orientation film 76 is formed. On the other hand, on a surface on the liquid crystal layer 71 side of the second substrate 72b, plural transparent pixel electrodes 77 arranged in a matrix shape and a thin film transistor (not shown) electrically connected to the respective transparent pixel electrodes 77 are provided. On the transparent pixel electrodes 77 and the thin film transistor, for example, an orientation film 78 is formed. The liquid crystal cell 70 includes the first and second substrates 72a and 72b, the liquid crystal layer 71 between the first and second substrates 72a and 72b, and the electrodes 75 and 77 as basic components. The liquid crystal cell 70 functions as an optical active element that changes a polarization state of incident light according to an input signal. The respective pixels forming the liquid crystal cell 70 include one pixel electrode 77, the common electrode 75, and the liquid crystal layer 71 between the pixel electrode 77 and the common electrode 75. A black matrix 79 of a lattice shape is provided between the first substrate 72a and the common electrode 75 to section the respective pixels.

The orientation films 76 and 78 are films for arraying liquid crystalline compounds forming the liquid crystal layer 71 in a necessary direction. One orientation film 76 orients the liquid crystalline compounds in contact with the orientation film 76 in a first rubbing direction (e.g., an X axis direction). The other orientation film 78 orients the liquid crystalline compound in contact with the orientation film 78 in a second rubbing direction (e.g., a Y axis direction). In an OFF state in which a voltage is not applied to the liquid crystal layer 71, the orientation film 76 has a role of orienting an optical axis of the liquid crystalline compound in a direction including an XZ plane as a polarization plane of the first polarization filter 31b. The polarization film 78 has a role of orienting an optical axis of the liquid crystalline compound in a direction including a YZ plane as a polarization plane of the second polarization filter 31c. As a result, the optical axes of the liquid crystalline compounds in the liquid crystal layer 71 are arranged to be gradually twisted from the first substrate 72a to the second substrate 72b. In other words, optical axes of a set of liquid crystalline compounds arranged on inner sides of the first and second substrates 72a and 72b, i.e., on both end sides of the liquid crystal layer 71 adjacent to the orientation films 76 and 78 form a twist angle of, for example, 90° when projected on an XY plane. Consequently, the liquid crystal layer 71 between the pair of polarization filters 31b and 31c is actuated in a normally white mode. It is possible to secure a maximum transmission state (a light-on state) in the OFF state in which a voltage is not applied. As described later, on both the end sides of the liquid crystal layer 71, i.e., in positions near the orientation films 76 and 78, the optical axes of the liquid crystalline compounds are not parallel to the XY plane, i.e., the incidence surface and the emission surface opposed to the orientation films 76 and 78. The optical axes are arranged in a state in which the optical axes tilt by a fixed pre-tilt angle with respect to the incidence surface and the emission surface.

On the other hand, in an ON state in which a voltage is applied to the liquid crystal layer 71, i.e., a light block state (a light off state), the optical axes of the liquid crystalline compounds in positions away from the orientation films 76 and 78 are oriented in a direction parallel to the normal of the first substrate 72a (specifically, a Z direction). However, on both the end sides of the liquid crystal layer 71, i.e., near the orientation films 76 and 78, the optical axes of the liquid crystalline compounds are maintained substantially in the original state. In other words, the optical axes of the liquid crystalline compounds on both the end sides are oriented in an X direction and a Y direction along the polarization surfaces of the first and second polarization filters 31b and 31c. However, the optical axes are not parallel to the XY plane, i.e., the incidence surface and the emission surface opposed to the orientation films 76 and 78 and are maintained in a state in which the optical axes tilt by the fixed tilt angle or a polar angle with respect to the incidence surface and the emission surface. In the OFF state in which a voltage is not applied to the liquid crystal layer 71 and the ON state in which a voltage is applied to the liquid crystal layer 71, the optical axes of the liquid crystalline compounds present in the positions near the orientation films 76 and 78 are maintained in an inclined state in which the optical axes are inclined with respect to the XY plane, although fluctuating a little. Therefore, when it is intended to perform optical compensation for the liquid crystal layer 71 in the ON state, i.e., the light block state, an inclination angle corresponding to such an inclined state is also referred to as a pre-tilt angle.

The first optical compensation member OC1 arranged on the emission side of the liquid crystal cell 70 includes a third optical element section 81a, a first optical element 81b, and a glass plate 81c in order from the incidence side. The third optical element section 81a, the first optical element 81b, and the glass plate 81c are flat elements, light incidence end faces and light emission end faces of which are parallel, and are bonded with one another by, for example, an optical adhesive. The first optical element 81b is a transparent positive uniaxial crystal and is formed of, for example, a crystal plate. The first optical element 81b is arranged such that an optical axis thereof forms a fixed angle with respect to the YZ plane and forms a predetermined inclination angle with respect to the Z axis. In other words, the optical axis of the first optical element 81b is parallel to, for example, the XZ plane and forms the predetermined inclination angle with respect to the Z axis. Thickness d1 of the first optical element 81b is set to an appropriate value with which optical compensation described later can be attained. The third optical element section 81a is formed by a stretched film of TAC (triacetyl cellulose) or the like having a refractive index anisotropy approximated to negative uniaxiality. Since adjustment of retardation for such a stretched film is relatively easy, the stretched film is suitable for mass production. A direction of an optical axis and thickness d3 of the third optical element section 81a are described later.

The second optical compensation member OC2 includes a third optical element section 83a, a second optical element 83b, and a glass plate 83c in order from the incidence side. The third optical element section 83a, the second optical element 83b, and the glass plate 83c are flat elements, light incidence end faces and light emission end faces of which are parallel, and are bonded with one another by, for example, an optical adhesive. The second optical element 83b is a transparent positive uniaxial crystal and is formed of for example, a crystal plate. The second optical element 83b is arranged such that an optical axis thereof forms a fixed angle with respect to the XZ plane and forms a predetermined inclination angle with respect to the Z axis. In other words, the optical axis of the second optical element 83b is parallel to, for example, the YZ plane and forms the predetermined angle with respect to the Z axis. Thickness d2 of the second optical element 83b is set to an appropriate value with which optical compensation described later can be attained. The third optical element section 83a is formed by a stretched film of TAC or the like having a refractive index anisotropy approximated to negative uniaxiality. A direction of an optical axis and thickness d3 of the third optical element section 83a are described later.

Parameters concerning the refractive index anisotropy of the third optical element sections 81a and 83a are explained. In the case of this embodiment, the third optical element section 81a of the first optical compensation member OC1 and the third optical element section 83a of the second optical compensation member OC2 are made of an identical material and have identical thickness. When refractive indexes in directions of respective axes x, y, and z with respect to refractive indexes of the third optical element sections 81a and 83a are nx, ny, and nz and the thickness in the z direction of the third optical element sections 81a and 83a is d3, parameters Re and Rth concerning the refractive index anisotropy of the third optical element sections 81a and 83a are given by the following equations:

$$Re=(nx-ny)*d3 \quad (1)$$

$$Rth=\{(nx+ny)/3-nz\}*d3 \quad (2)$$

The parameters satisfy the following conditional expression:

$$-Rth<Re<Rth \quad (3)$$

In other words, according to the setting of a method of manufacturing the stretched film forming the third optical element sections 81a and 83a, in refractive index ellipsoids of the third optical element sections 81a and 83a, a refractive index difference Re between a pair of major axis sides (nx and ny) is set smaller than a refractive index difference Rth between the major axis sides (nx and ny) and a shortest diameter (nz). Rth is a positive value.

The first and second optical compensation members OC1 and OC2 explained above have a role of cooperating to compensate for viewing angle dependency and the fall in a contrast due to the pre-tilt of the liquid crystal layer 71.

Specifically, the first optical element 81b and the second optical element 83b effectively cancel components in the XY plane in liquid crystal retardation due to the pre-tile of the liquid crystal present on both the end sides of the liquid crystal layer 71. Therefore, in assembling the first and second optical elements 81b and 83b, azimuth angles and polar angles of the optical axes of the optical elements are adjusted and the thicknesses d1 and d2 of the optical elements are adjusted.

Moreover, the third optical element sections 81a and 83a function as a third optical element by cooperating each other and have a role of effectively canceling components in a direction perpendicular to the incidence surface and the emission surface in liquid retardation due to the pre-tilt of the liquid crystal present on both the end sides of the liquid crystal layer 71 and canceling concomitant retardation concerning the Z direction due to the first and second optical elements 81b and 83b. Therefore, the thickness d3 is adjusted together with directions of the optical axes of the third optical element sections 81a and 83a.

FIGS. 2A to 2D are perspective views conceptually explaining compensation of a pre-tilt (i.e., compensation of liquid crystal retardation) by the first optical element 81b and the second optical element 83b.

Figure 2A:
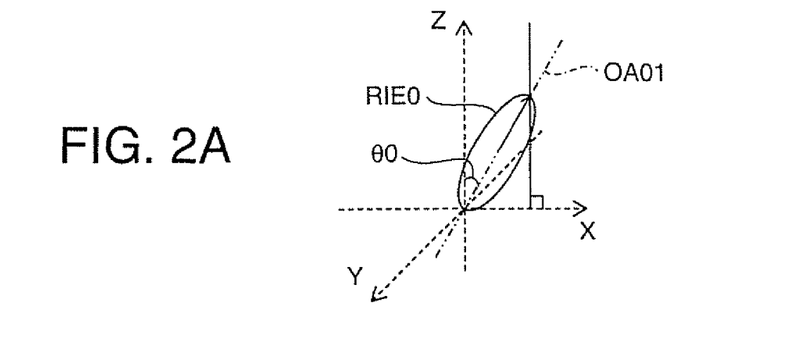
FIGS. 2A to 2D are diagrams for explaining compensation for a pre-tilt by first and second compensation elements.

As shown in FIG. 2A, an average pre-tilt on the incidence surface side of the liquid crystal layer 71 can be regarded as, for example, being substantially parallel to the XZ plane and tilting by an angle θ0 with respect to the Z axis. In other words, a refractive index ellipsoid RIE0 having such a pre-tilt is in a state in which an optical axis OA01 thereof tilts by a polar angle θ0 with respect to the Z axis. The optical axis OA01 is orientated substantially in a +X direction. In a position close to the incidence surface of the liquid crystal layer 71, in particular, an optical axis of a liquid crystalline compound extremely close to the incidence surface is equal to a pre-tilt angle before a voltage is applied. In general, an angle formed by the optical axis with respect to the incidence surface is smaller than about 10°. Moreover, during the voltage application, toward the center of the liquid crystal layer, the optical axis of the liquid crystalline compound suddenly approaches an angle parallel to a normal direction of the incidence surface, i.e., the Z direction.

Figure 2B:
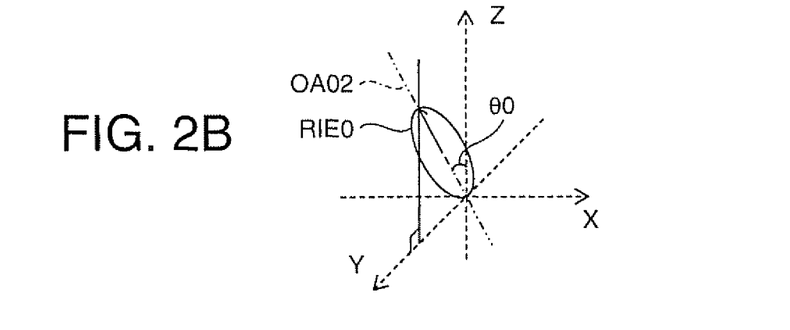

As shown in FIG. 2B, an average pre-tilt on the emission surface side of the liquid crystal layer 71 can be regarded as, for example, being substantially parallel to the YZ plane and tilting by the angle θ0 with respect to the Z axis. In other words, the refractive index ellipsoid RIE0 having the pre-tilt is in a state in which an optical axis OA02 thereof tilts by the polar angle θ0 with respect to the Z axis. The optical axis OA02 is orientated substantially in a +Y direction. In a position close to the incidence surface of the liquid crystal layer 71, in particular, an optical axis of a liquid crystalline compound extremely close to the emission surface is equal to a pre-tilt angle before a voltage is applied. In general, an angle formed by the optical axis with respect to the emission surface is smaller than about 10°. Moreover, during the voltage application, toward the center of the liquid crystal layer, the optical axis of the liquid crystalline compound suddenly approaches an angle parallel to a normal direction of the emission surface, i.e., the Z direction.

Figure 2C:
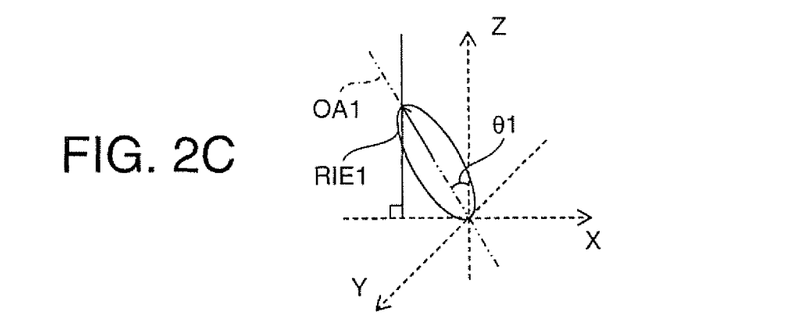
Figure 2D:
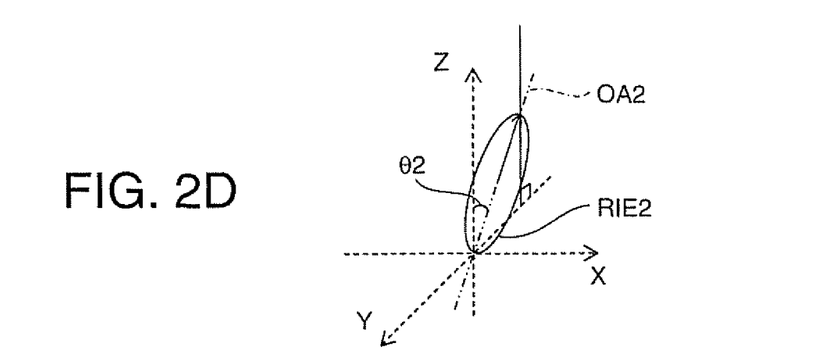

As shown in FIG. 2C, a refractive index ellipsoid RIE1 of the first optical element 81b is in a state in which an optical axis OA1 thereof is substantially parallel to the XZ plane and tilts by an angle θ1 with respect to the Z axis. As shown in FIG. 2D, a refractive index ellipsoid RIE2 of the second optical element 83b is in a state in which an optical axis OA2 thereof is substantially parallel to the YZ plane and tilts by an angle θ2 with respect to the Z axis.

Figure 3:
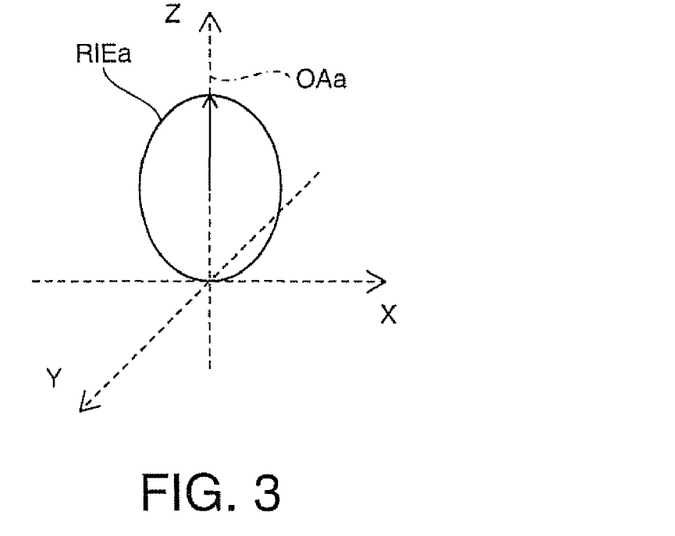
FIG. 3 is a diagram for conceptually explaining the effect of compensation by the first and second compensation elements.

FIG. 3 is a diagram for conceptually explaining the effect of compensation by the first and second optical elements 81b and 83b. A refractive index ellipsoid RIEa formed by combining pre-tilts near the incidence surface and the emission surface of the liquid crystal layer 71 and refractive index anisotropies of the first and second optical elements 81b and 83b has a refractive index characteristic of positive uniaxiality in which an optical axis OAa thereof is a major axis parallel to the Z axis. The refractive index ellipsoid RIEa can be regarded as an imaginary residual birefringence as a result obtained by adding up components in the Z direction in liquid crystal retardation due to the pre-tilt of the liquid crystal layer 71 and concomitant retardation concerning the Z direction due to the refractive index ellipsoids RIE1 and RIE2 of the first and second optical elements 81b and 83b.

Figure 4:
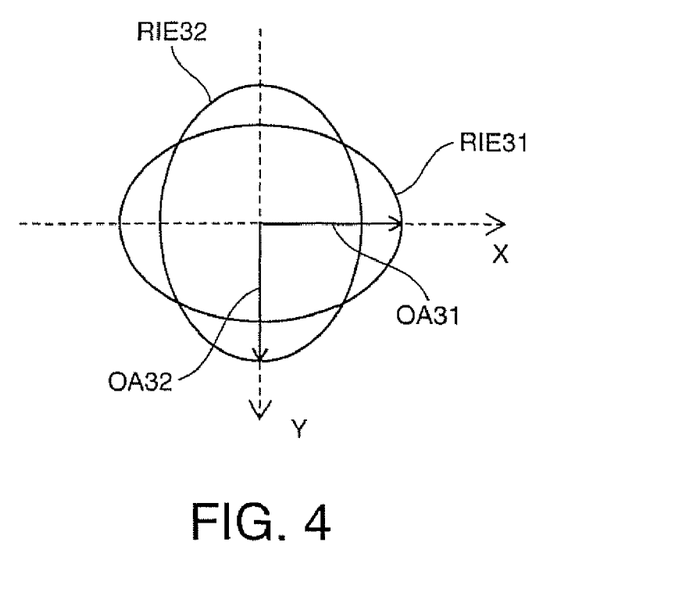
FIG. 4 is a diagram for conceptually explaining the effect of division and array of a third optical element.

FIG. 4 is a diagram for explaining a direction of longest axes of the respective third optical element sections 81a and 83a forming the third optical element. When the two third optical element sections 81a and 83a have an equal retardation Re, a longest axis OA31 of a refractive index ellipsoid RIE31 of the third optical element section 81a provided in the first optical compensation member OC1 extends in a direction of 0° with respect to the X axis. A longest axis OA32 of a refractive index ellipsoid RIE32 of the third optical element section 83a provided in the second optical compensation member OC2 extends in a direction of 90° with respect to the X axis. In other words, optical axes of the third optical element sections 81a and 83a form equal angles orthogonal to each other.

In this case, in the third optical element sections 81a and 83a, a longer axis (if nx>ny, the x axis) on the major axis side of the refractive index ellipsoid is allocated to an equal direction in the XY plane while a shortest axis z of the refractive index ellipsoid is kept aligned in the Z direction parallel to the normals of the incidence and emission surfaces. Thus, refractive index anisotropies, i.e., retardation in the XY plane of the third optical element sections 81a and 83a can be offset each other. In the third optical element as a whole, compensation in a strict sense of negative uniaxial crystal is possible.

Figure 5A:
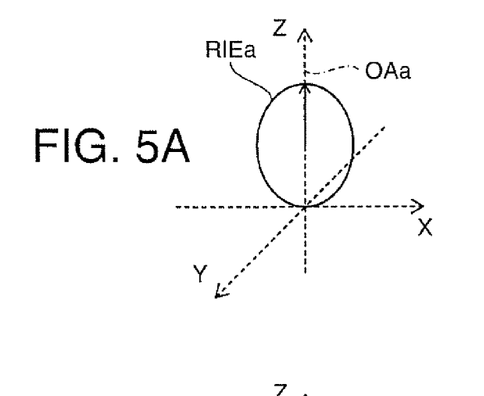
FIGS. 5A to 5C are diagrams for explaining compensation of residual birefringence due to the third optical element.
Figure 5B:
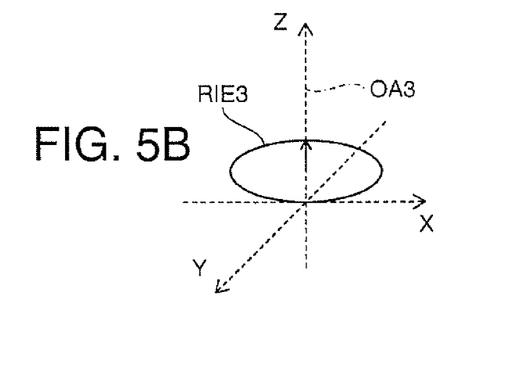
Figure 5C:
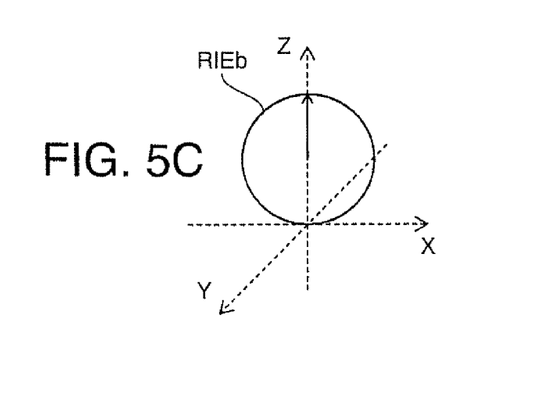

FIGS. 5A to 5C are diagrams for explaining compensation of the residual birefringence by the third optical element sections 81a and 83a. FIG. 5A corresponds to FIG. 3 and shows a refractive index ellipsoid RIEa remaining after compensation of a pre-tilt of the liquid crystal layer 71 by the first and second optical elements 81b and 83b. FIG. 5B shows a refractive index ellipsoid RIE3 obtained by combining the third optical element sections 81a and 83a. The refractive index ellipsoid RIE3 has negative uniaxiality in which an optical axis OA3 thereof is a minor axis parallel to the Z axis. Since the refractive index ellipsoid RIEa indicates positive uniaxiality and the refractive index ellipsoid RIE3 indicates negative uniaxiality, it is possible to offset apparent refractive index anisotropies by combining both the refractive index ellipsoids. In other words, as shown in FIG. 5C, a refractive index ellipsoid RIEb after compensation of the pre-tilt of the liquid crystal layer 71 by the first and second optical elements 81b and 83b and the third optical element sections 81a and 83a is close to a substantial circular shape. Thus, it is possible to control a change in retardation with respect to not only a light beam from a front direction parallel to the Z axis but also a light beam having fixed inclination to the front direction. It is possible to realize a satisfactory optical modulation characteristic over a wide viewing angle range.

Ideal phase compensation is explained above. However, in an actual liquid crystal light valve 31, the pre-tilt of the liquid crystal layer 71 varies in each product. It is not easy to strictly secure machining accuracy of the first and second optical elements 81b and 83b and the third optical element sections 81a and 83a. Therefore, during assembly of the liquid crystal light valve 31, it is necessary to perform adjustment by rotating the first and second optical elements 81b and 83b and the third optical element sections 81a and 83a around a system optical axis, i.e., an axis parallel to the Z axis. If the liquid crystal light valve 31 is manufactured by adjusting all rotating positions of the first and second optical elements 81b and 83b and the third optical element sections 81a and 83a without providing adjustment mechanisms for the first and second optical elements 81b and 83b and the third optical element sections 81a and 83a, the adjustment is complicated and cost increases. If adjustment mechanisms are provided for all of the first and second optical elements 81b and 83b and the third optical element sections 81a and 83a, it is difficult to secure a space for the adjustment mechanisms and, after all, an adjustment process is complicated. Therefore, in this embodiment, the first optical element 81b and the third optical element section 81a are bonded to each other to form a first group, i.e., the first optical compensation member OC1. The second optical element 83b and the third optical element section 83a are bonded to each other to form a second group, i.e., the second optical compensation member OC2. Consequently, although deviation in directions during bonding remains in the first optical element 81b and the third optical element section 81a, the deviation does not substantially affect deterioration in a contrast as described later. Further, although deviation in directions during bonding also remains in the second optical element 83b and the third optical element section 83a, the deviation does not substantially affect deterioration in a contrast as described later. Moreover, for example, if the first optical compensation member OC1 is rotated, the second optical compensation member OC2 may be kept fixed. By fixing the second optical compensation member OC2 and rotating the first optical compensation member OC1, it is possible to align retardation to polarized light components at an angle of about ±45° with respect to an incident polarization axis. In aligning the retardation, retardation remain in a polarized light component parallel to the incident polarization axis and a polarized light component vertical to the incident polarization axis as residual retardation. However, it is possible to minimize the fall in a contrast.

Figure 6:
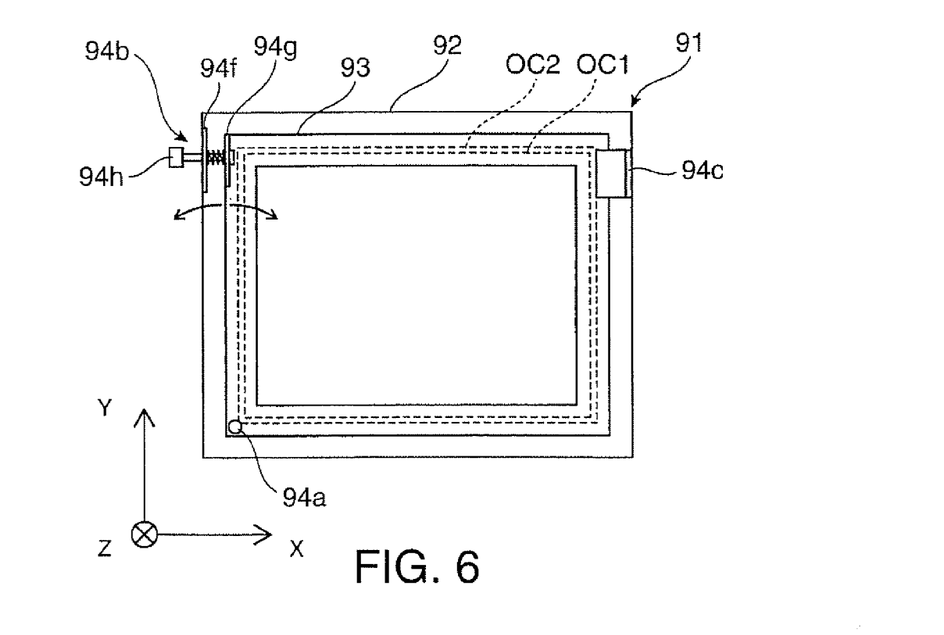
FIG. 6 is a front view for explaining the structure of an adjustment mechanism for rotating a first optical compensation member.

FIG. 6 is a front view for explaining the structure of an adjustment mechanism 91 for rotating the first optical compensation member OC1 around the system optical axis, i.e., the axis parallel to the Z axis. The adjustment mechanism 91 includes a first holder 92 that holds the second optical compensation member OC2, a second holder 93 that holds the first optical compensation member OC1, and an adjustment member 94 that adjusts rotating positions of the first and second holders 92 and 93 with respect to each other. The adjustment member 94 includes a shaft member 94a that couples the first and second holders 92 and 93, a screw adjustment section 94b that rotates the second holder 93 clockwise or counterclockwise, and a guide 94c that is fixed to the first holder 92 side and guides an edge portion of the second holder 93. The screw adjustment section 94b includes a screw 94h for adjusting a space between supporting plates 94f and 94g extending from both the holders 92 and 93. According to forward and reverse rotations of the screw adjustment section 94b, it is possible to finely adjust a rotation posture of the second holder 93 with respect to the first holder 92, i.e., a rotation posture of the first optical compensation member OC1 with respect to the second optical compensation member OC2. The adjustment mechanism 91 described above is only an example. Various thin adjustment mechanisms that finely rotate the first optical compensation member OC1 around the Z axis can be adopted.

Figure 7:
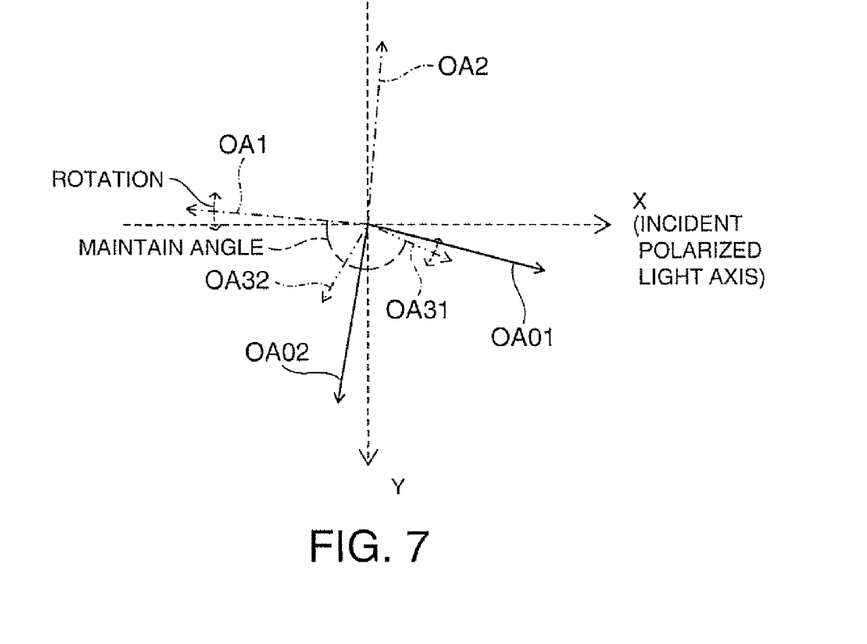
FIG. 7 is a diagram for explaining adjustment of a residual retardation of the liquid crystal light valve by the adjustment mechanism in FIG. 6.

FIG. 7 is a diagram for explaining adjustment of a residual retardation of the liquid crystal light valve 31 by the adjustment mechanism 91 in FIG. 6. In this case, a retardation projected on the XY plane is shown. A direction of the optical axis OA01 corresponding to a pre-tilt on the incidence surface side of the liquid crystal layer 71 is not accurately along the X axis and forms a fixed angle with respect to the X axis. Similarly, a direction of the optical axis OA02 corresponding to a pre-tilt on the emission surface side of the liquid crystal layer 71 is not accurately along the Y axis and forms a fixed angle with respect to the Y axis.

The optical axis OA1 of the first optical element 81b on the first optical compensation member OC1 side is not accurately along the X axis and forms a fixed angle with respect to the X axis. Similarly, the optical axis OA2 of the second optical element 83b on the second optical compensation member OC2 side is not accurately along the Y axis and forms a fixed angle with respect to the Y axis.

Moreover, an optical axis OA31 of the third optical element section 81a on the first optical compensation member OC1 side is not accurately along the X axis and forms a fixed angle with respect to the X axis. Similarly, an optical axis OA 32 of the third optical element section 83a on the second optical compensation member OC2 side is not accurately along the Y axis and forms a fixed angle with respect to the Y axis.

In the above explanation, the optical axes OA01 and OA02 corresponding to the pre-tilt of the liquid crystal layer 71 are fixed. The optical axis OA2 and the optical axis OA32 forming an optical azimuth of the second optical compensation member OC2 are also fixed in this embodiment. On the other hand, the optical axis OA1 and the optical axis OA31 forming an optical azimuth of the first optical compensation member OC1 can be integrally rotated around the Z axis by the adjustment mechanism 91 in FIG. 6. Retardation of the optical axis OA1 and the optical axis OA31 can be aligned to polarized light components at an angle of ±45° with respect to the incident polarization axis, i.e., the X axis direction. In aligning the retardation, the retardation remain in polarized light components parallel to the incident polarization axis and polarized light components perpendicular to the incident polarization axis as residual retardation. However, the fall in a contrast is minimized as described above.

Figure 8:
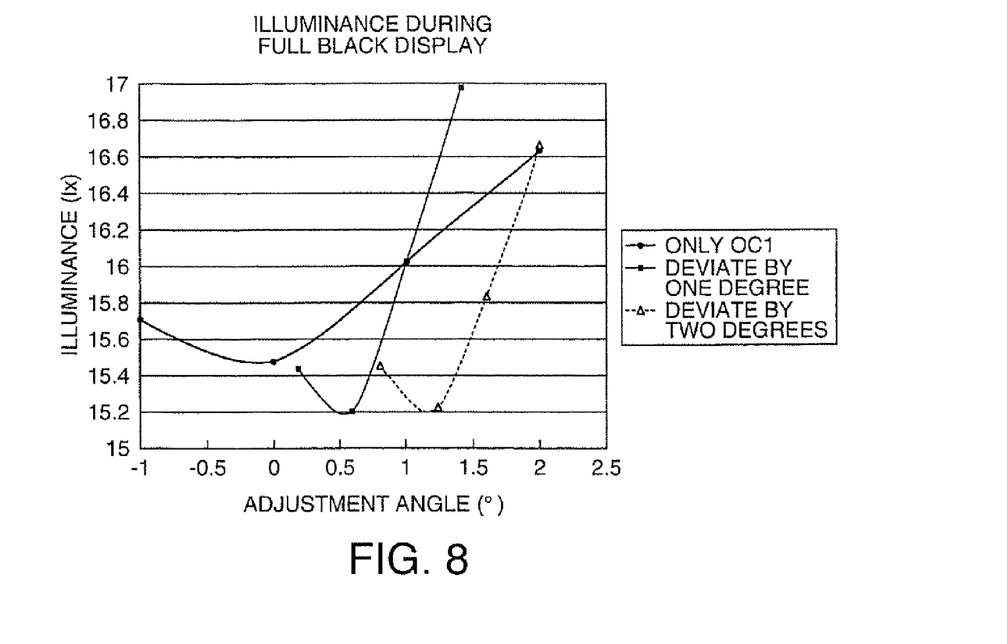
FIG. 8 is a graph for specifically explaining the adjustment of the residual retardation of the liquid crystal light valve.

FIG. 8 is a graph for explaining adjustment of a residual retardation of the liquid crystal light valve 31 by the adjustment mechanism 91 in FIG. 6. The abscissa represents an adjustment angle (°) for adjustment by the adjustment mechanism 91 and the ordinate represents illuminance (1×) in black display of the liquid light valve 31. In the graph, a curved solid line indicated by black circles indicates an illuminance change at the time when it is assumed that all the compensation elements, i.e., the first and second optical elements 81b and 83b and the third optical element sections 81a and 83a are aligned to the pre-tilt on the incidence surface side of the liquid crystal layer 71 and at the time when the first optical compensation member OC1 is rotated by the adjustment mechanism 91. A dotted curved line indicated by black squares indicates a result obtained by measuring how the illuminance of the black display changes when a rotation angle of the first optical compensation member OC1 is adjusted by the adjustment mechanism 91 in FIG. 6 on the premise that the third optical element section 81a of the first optical compensation member OC1 deviates from an ideal value by 1°. An alternate long and short dash curved line indicated by triangles indicates a result obtained by measuring how the illuminance of the black display changes when a rotation angle of the first optical compensation member OC1 is adjusted by the adjustment mechanism 91 in FIG. 6 on the premise that the third optical element section 81a of the first optical compensation member OC1 deviates from the ideal value by 2°. As it is evident from the graph, it is seen that a satisfactory contrast can be secured by adjusting an optical azimuth of the residual retardation according to the rotation of the first optical compensation member OC1. An optical azimuth of a group is defined as a low axis of combined retardation with retardation of all of the components included in the group. For example, the optical azimuth of the first optical compensation member OC1 including the third optical element section 81a having retardation and the first optical element 81b having retardation is a low axis of combined retardation with retardation of the third optical element section 81a and retardation of the first optical element 81b. For example, a low axis of residual retardation when the optical azimuth of the first optical compensation member OC1 is adjusted with respect to the liquid crystal light valve 31 and the second optical compensation member OC2 to compensate for residual retardation of liquid crystal light valve 31 is an optical azimuth of final residual retardation.

As it is evident from the above explanation, in the liquid crystal light valve 31 according to this embodiment, the third optical element sections 81a and 83a have negative uniaxiality or refractive index anisotropies approximated to negative uniaxiality. Thus, optical compensation for an obliquely incident light beam, which cannot be sufficiently corrected by the first and second optical elements 81b and 83b having positive uniaxiality, is easily attained. Consequently, retardation of an image light caused by the respective pre-tilts formed on the incidence surface side and the emission surface side of the liquid crystal layer 71 can be approximately offset or reduced in a wide viewing angle range. As a result, a contrast is improved. Moreover, since a viewing angle is compensated, it is possible to project an image with less color unevenness. In projecting the image, an optical azimuth of the first optical compensation member OC1 having the third optical element section 81a, which is one of the third optical elements, as an optical film can be adjusted by the adjustment mechanism 91 with respect to the fixed optical azimuth of the second optical compensation member OC2. Thus, according to the rotation adjustment of the third optical element section 81a relatively less affected by the adjustment, it is possible to perform fine adjustment for reducing the residual retardation of the liquid crystal light valve 31 concerning an adjustment reference direction of ±45° with respect to the polarization axes of the first and second polarization filters 31b and 31c.

In the first embodiment described above, the first optical compensation member OC1 is rotated. However, it is also possible to fix the first optical compensation member OC1 and rotate the second optical compensation member OC2. It is also possible to incorporate the third optical element section 81a in the second optical compensation member OC2 to form the second optical element 83b and the third optical element section 81a as a set and incorporate the third optical element section 83a in the first optical compensation member OC1 to form the first optical element 81b and the third optical element section 83a as a set. Moreover, the optical films forming the third optical element are not limited to the two third optical element sections 81a and 83a and may be one or three or more films. In the case of three or more optical films, longer axes on major axis sides of refractive index ellipsoids are allocated in a uniform direction in the XY plane while shortest axes z of the refractive index ellipsoids are aligned in the Z direction. Alternatively, the optical films are divided into two groups and longer axes on major axis sides of refractive index ellipsoids in the respectively groups are aligned and arranged such that the longer axes on the major axis sides of the refractive index ellipsoids of the divided groups cross at a right angle. Moreover, in this case, a difference between the numbers of optical element sections allocated to the first optical compensation member OC1 and the second optical compensation member OC2 is controlled to be less than 2. Consequently, a magnitude of a retardation that affects polarized light made incident from a direction parallel to the system optical axis according to the optical azimuth of the first optical compensation member OC1 and a magnitude of a retardation that affects polarized light made incident from a direction parallel to the system optical axis according to the optical azimuth of the second optical compensation member OC2 are relatively balanced. It is possible to set a relatively small residual retardation that affects polarized light made incident at a predetermined angle to the system optical axis. The residual retardation remains after adjustment of a relative position of the optical azimuth in the plane perpendicular to the system optical axis of the first optical compensation member OC1 with respect to the optical azimuth in the plane perpendicular to the system optical axis of the second optical compensation member OC2.

Since the first optical element 81b and the second optical element 83b are usually thin, it is also possible to sandwich the first optical element 81b and the second optical element 83b with glass substrates from both sides to increase the intensity and the flatness of the surfaces of the optical elements. Conversely, it is also possible to sandwich a glass substrate with the first optical element 81b the second optical element 83b to form an element and apply surface machining such as etching to the first optical element 81b and the second optical element 83b on which the surface of the element appears.

Second Embodiment

A liquid crystal light valve as a liquid crystal device according to a second embodiment of the invention is explained below. The liquid crystal light valve according to the second embodiment is a modification of the liquid crystal light valve according to the first embodiment. Components not specifically explained below are the same as those in the first embodiment and redundant explanation of the components is omitted.

Figure 9:
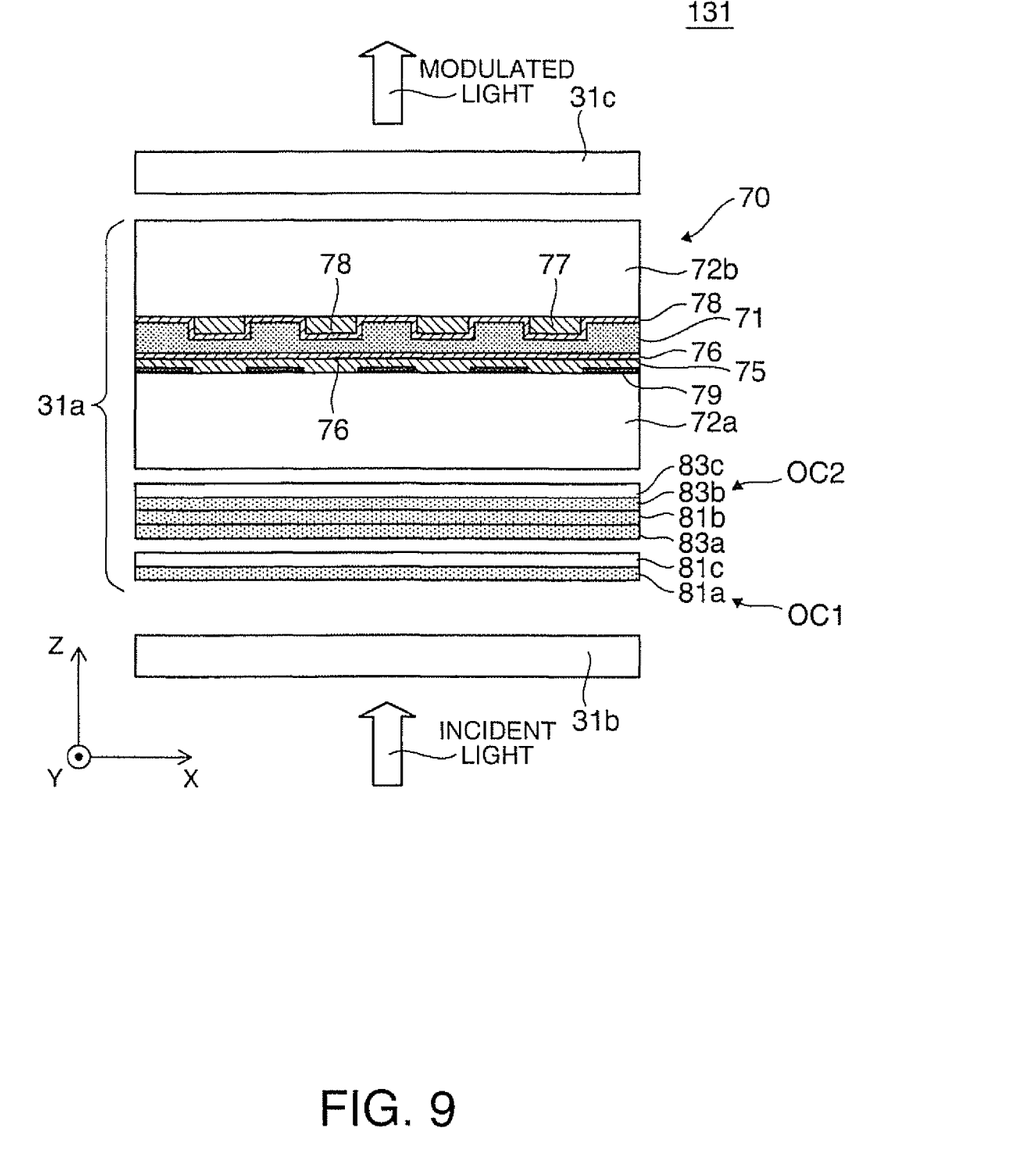
FIG. 9 is a side sectional view for explaining a liquid crystal light valve according to a second embodiment of the invention.

FIG. 9 is an enlarged sectional view for explaining the structure of the liquid crystal light valve according to the second embodiment. In a liquid crystal light valve 131 shown in the figure, the third optical element section 81a is incorporated in the first optical compensation member OC1 of the first group in the polarized light modulating unit 31a. The first and second optical elements 81b and 83b and the third optical element section 83a are incorporated in the second optical compensation member OC2 of the first group.

Figure 10:
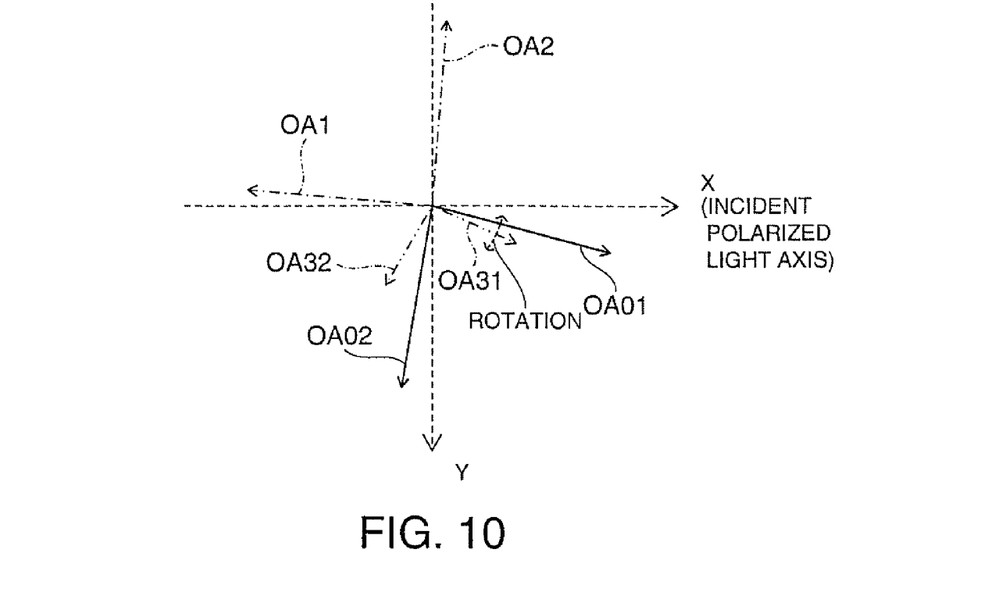
FIG. 10 is a diagram for explaining adjustment of a residual retardation of the liquid crystal light valve by an adjustment mechanism.

FIG. 10 is a diagram for explaining adjustment of a residual retardation of the liquid crystal light valve 131 according to the second embodiment. Directions of the optical axes OA01 and OA02 corresponding to a pre-tilt of the liquid crystal layer 71 are the same as those in FIG. 7. The optical axes OA1 and OA2 of the first and second optical elements 81b and 83b and the optical axes OA31 and OA32 of the third optical element sections 81a and 83a are also the same as those in FIG. 7. However, in this case, the optical axes OA1, OA2, and OA32 forming the optical azimuth of the second optical compensation member OC2 are fixed. The optical axis 31 forming the optical azimuth of the first optical compensation member OC1 is rotated around the Z axis by the adjustment mechanism 91 in FIG. 6. In this case, as in the above case, it is possible to align retardation to polarized light components at an angle of ±45° with respect to the incident polarization axis, i.e., the X axis direction.

Figure 11:
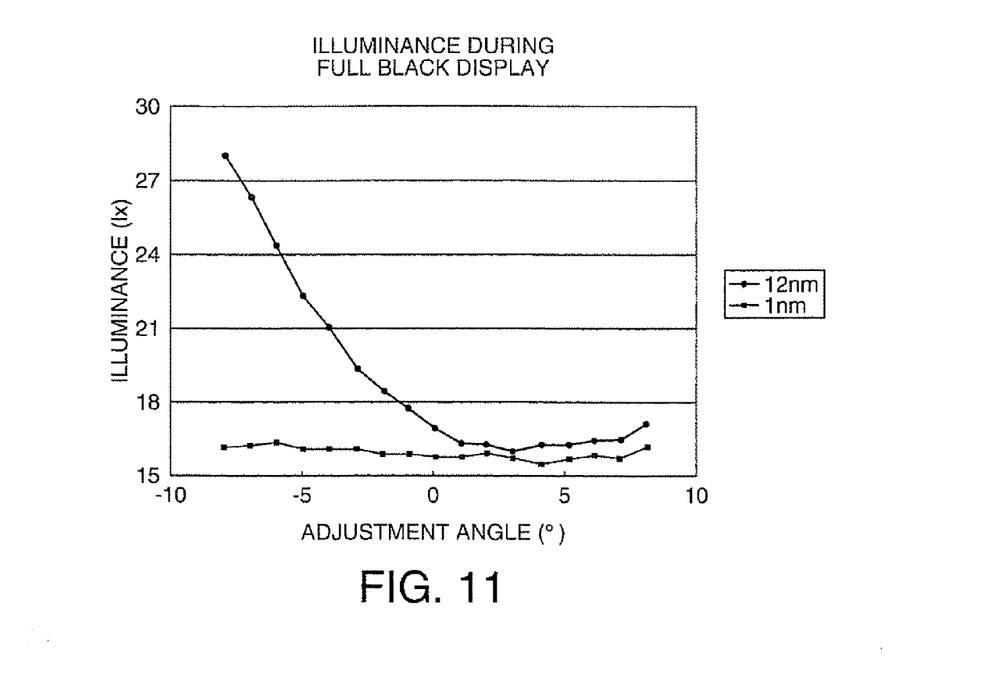
FIG. 11 is a graph for specifically explaining the adjustment of the residual retardation of the liquid crystal light valve.

FIG. 11 is a graph for specifically explaining adjustment of the residual retardation of the liquid crystal light valve 131 by the adjustment mechanism 91 in FIG. 6. The abscissa represents an adjustment angle (°) for adjustment by the adjustment mechanism 91 and the ordinate represents illuminance (1×) in black display of the liquid crystal light valve 31. In the graph, a curved line indicated by black circles indicates a result obtained by measuring a change in illuminance following the rotation of the first optical compensation member OC1 at the time when retardation in the XY plane of the first optical compensation member OC1 is about 12 nm. A curved line indicated by black squares indicates a result obtained by measuring a change in illuminance following the rotation of the first optical compensation member OC1 at the time when retardation in the XY plane of the first optical compensation member OC1 is about 1 nm. As it is seen from the above description, in the first optical compensation member OC1 in which a retardation in the XY plane of about 12 nm remains, the residual retardation can be adjusted by rotating the optical azimuth in the XY plane, a change can be given to the illuminance (1×) in the black display of the liquid crystal light valve 31, and a satisfactory contrast can be secured. However, in the first optical compensation member OC1 in which a retardation in the XY plane of about 12 nm remains, the influence on illuminance by the rotation thereof is larger than the influence on illuminance by the rotation of the first optical compensation member OC1 in which a retardation in the XY plane of about 1 nm remains. Therefore, when retardation in the XY plane of the first optical compensation member OC1 is large, since an amount of change in illuminance with respect to the rotation of the first optical compensation member OC1 is large, it is possible to narrow a rotation range of the adjustment mechanism. When retardation in the XY plane of the first optical compensation member OC1 is small, since an amount of change in illuminance with respect to the rotation of the first optical compensation member OC1 is small, fine adjustment by the adjustment mechanism is possible.

In the second embodiment described above, optical films forming the third optical element are not limited to the two third optical element sections 81a and 83a and may be one or three or more films. In this case, in the first optical compensation member OC1, a retardation in the XY plane is secured that is enough for reducing a residual retardation of the liquid light valve 31 concerning the adjustment reference direction at ±45° with respect to the polarized light axes of the first and second polarization filters 31b and 31c according to the rotation of the first optical compensation member OC1.

Third Embodiment

Figure 12:
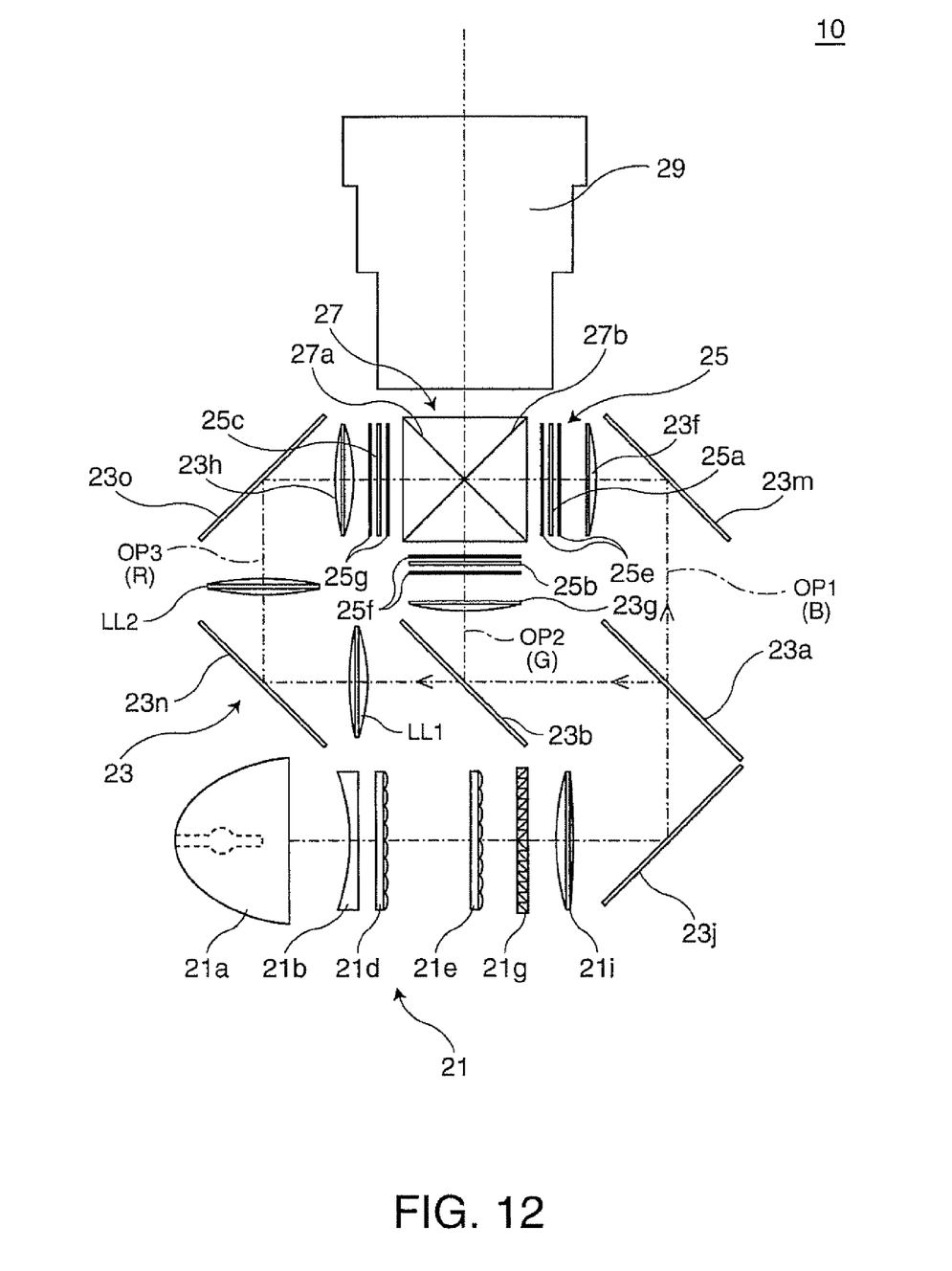

FIG. 12 is a diagram for explaining the structure of an optical system of a projector incorporating the liquid crystal light valve 31 and the like shown in FIG. 1.

A projector 10 according to this embodiment includes a light source device 21 that generates light source light, a color separation optical system 23 that divides the light source light from the light source device 21 into three colors of red, green, and bluer a light modulating unit 25 illuminated by illumination lights of the respective colors emitted from the color separation optical system 23, a cross dichroic prism 27 that combines image lights of the respective colors from the light modulating unit 25, and a projection lens 29 as a projection optical system for projecting the image lights transmitted through the cross dichroic prism 27 on a screen (not shown). Among these components, the light source device 21, the color separation optical system 23, the light modulating unit 25, and the cross dichroic prism 27 constitute an image forming apparatus that forms image lights that should be projected on the screen.

In the projector 10 described above, the light source device 21 includes a light source lamp 21a, a concave lens 21b, a pair of lens arrays 21d and 21e, a polarization conversion member 21g, and a superimposing lens 21i. The light source lamp 21a is, for example, a high-pressure mercury lamp including a concave mirror that collects light source light and emits the light source light forward. The concave lens 21b has a role of parallelizing the light source light from the light source lamp 21a. However, the concave lens 21b may be omitted. The pair of lens arrays 21d and 21e include plural element lenses arranged in a matrix shape. The pair of lens arrays 21d and 21e divide the light source light from the light source lamp 21a transmitted through the concave lens 21b with these element lenses and individually condense the divided light source lights and cause the light source lights to diverge. The polarization conversion member 21g converts the light source light emitted from the lens array 21e into, for example, only an S polarized light component perpendicular to the paper surface of FIG. 12 and supplies the light source light to an optical system at the next stage. The superimposing lens 21i makes it possible to perform superimposed illumination on light modulating devices for the respective colors provided in the light modulating unit 25 by appropriately converging illumination light transmitted through the polarization conversion member 21g as a whole. In other words, the illumination light transmitted through both the lens arrays 21d and 21e and the superimposing lens 21i passes through the color separation optical system 23 described below in detail and uniformly subjects liquid crystal panels 25a, 25b, and 25c of the respective colors provided in a light modulating unit 25 to superimposed illumination.

The color separation optical system 23 includes first and second dichroic mirrors 23a and 23b, three field lenses 23f, 23g, and 23h as correction optical systems, and reflection mirrors 23j, 23m, 23n, and 23o and constitutes an illumination device together with the light source device 21. The first dichroic mirror 23a reflects, for example, red light and green light and transmits blue light among lights of three colors of red, green, and blue. The second dichroic mirror 23b reflects, for example, the green light and transmits the red light of the red and green light made incident thereon. In the color separation optical system 23, substantially white light source light from the light source device 21 has an optical path thereof bent by the reflection mirror 23j and is made incident on the first dichroic mirror 23a. The blue light transmitted through the first dichroic mirror 23a is made incident on the field lens 23f through the reflection mirror 23m while keeping a state of, for example, S polarized light. The green light reflected by the first dichroic mirror 23a and further reflected by the second dichroic mirror 23b is made incident on the field lens 23g while keeping a state of, for example, S polarized light. The red light transmitted through the second dichroic mirror 23b is made incident on the field lens 23h for adjusting an incidence angle through lenses LL1 and LL2 and reflection mirrors 23n and 23o while keeping a state of, for example, S polarized light. The lenses LL1 and LL2 and the field lens 23h constitute a relay optical system. This relay optical system has a function of substantially directly transmitting an image on the first lens LL1 to the field lens 23h through the second lens LL2.

The light modulating unit 25 includes three liquid crystal panels 25a, 25b, and 25c and three pairs of polarization filters 25e, 25f, and 25g arranged to hold the liquid crystal panels 25a, 25b, and 25c, respectively. The liquid crystal panel 25a for blue light and the pair of polarization filters 25e holding the liquid crystal panel 25a constitute a liquid crystal light valve for blue for two-dimensionally subjecting blue light among image lights after luminance modulation to luminance modulation on the basis of image information. The liquid crystal light valve for blue has the structure same as that of the liquid crystal light valves 31 and 131 shown in FIG. 1 and the like and incorporates the first and second optical compensation members OC1 and OC2 for improvement of a contrast. The first optical compensation member OC1 can be rotated around an axis parallel to the system optical axis OA by the adjustment mechanism 91 in FIG. 6. Similarly, the liquid crystal panel 25b for green light and the polarization filters 25f corresponding thereto constitute a liquid crystal light valve for green. The liquid crystal panel 25c for red light and the polarization filters 25g constitute a liquid crystal light valve for red. The liquid crystal light valves for green and red also have the structure same as that of the liquid crystal light valves 31 and 131 shown in FIG. 1 and the like. In other words, the liquid crystal light valves for green and red have the first and second optical compensation members OC1 and OC2. The first optical compensation member OC1 can be rotated around the axis parallel to the system optical axis OA by the adjustment mechanism 91 in FIG. 6.

The blue light transmitted through the first dichroic mirror 23a of the color separation optical system 23 to be divided is made incident on the first liquid crystal panel 25a for blue light through the field lens 23f. The green light reflected by the second dichroic mirror 23b of the color separation optical system 23 to be divided is made incident on the second liquid crystal panel 25b for green light through the field lens 23g. The red light transmitted through the second dichroic mirror 23b to be divided is made incident on the third liquid crystal panel 25c for red light through the field lens 23h. The liquid crystal panels 25a to 25c are non-luminous light modulating devices that modulate a spatial intensity distribution of incident illumination light in pixel units. The lights of the three colors made incident on the liquid crystal panels 25a to 25c, respectively are modulated according to driving signals or image signals inputted to the liquid crystal panels 25a to 25c as electric signals, respectively. When the lights are modulated, polarization directions of the illumination lights made incident on the liquid crystal panels 25a to 25c are adjusted by the polarization filters 25e, 25f, and 25g, respectively. Component lights in a predetermined polarization direction are extracted as image lights from modulated lights emitted from the liquid crystal panels 25a to 25c, respectively.

The cross dichroic prism 27 is a light combining member and assumes a substantially square shape in plan view obtained by bonding four rectangular prisms together. A pair of dielectric multilayer films 27a and 27b crossing in an X shape are formed on interfaces of the bonding of the rectangular prisms. One first dielectric multilayer film 27a reflects blue light and the other second dielectric multilayer film 27b reflects red light. The cross dichroic prism 27 reflects the blue light from the liquid crystal panel 25a on the first dielectric multilayer film 27a and emits the blue light to a right side in a traveling direction thereof. The cross dichroic prism 27 advances the green light from the liquid crystal panel 25b straight and emits the green light through the first and second dielectric multilayer films 27a and 27b. The cross dichroic prism 27 reflects the red light from the liquid crystal panel 25c on the second dielectric multilayer film 27b and emits the red light to a left side in a traveling direction thereof.

The projection lens 29 projects color image light combined by the cross dichroic prism 27 on a screen (not shown) at a desired magnification. In other words, a color moving image or a color still image of the desired magnification corresponding to the driving signals or the image signals inputted to the liquid crystal panels 25a to 25c is projected on the screen.

The invention has been explained according to the embodiments. However, the invention is not limited to the embodiments described above. It is possible to carry out the invention in various forms without departing from the spirit of the invention. For example, modifications described below are possible.

In the embodiments, the crystal plates are used as the first and second optical elements 81b and 83b. However, positive uniaxial crystals and organic materials (e.g., liquid crystals or stretched films) can be used instead of the crystal plates.

In the embodiments, TAC is used as the optical films forming the third optical element. However, besides TAC, a negative uniaxial material and a material having refractive index anisotropy approximated to negative uniaxiality can also be used. Specifically, inorganic materials such as sapphire, calcite, KDP (potassium dihydrogen phosphate), and ADP (ammonium dihydrogen phosphate) can also be used. Various olefin organic materials can also be used. Moreover, the third optical element can also be formed of a single optical film for compensation. However, when the third optical element is formed of plural layers of optical films for compensation, it is also possible to form the third optical element by combining and stacking plural kinds of material layers.

In the embodiments, at least one of the third optical element sections 81a and 83a is incorporated in the first optical compensation member OC1 to adjust a residual retardation. However, only the first optical element 81b can also be incorporated in the first optical compensation member OC1 to adjust a residual retardation. Alternatively, only the second optical element 83b can also be incorporated in the first optical compensation member OC1 to adjust a residual retardation.

In the embodiments, the first and second optical compensation members OC1 and OC2 are arranged between the liquid crystal cell 70 and the first polarization filter 31b.

However, the optical compensation members OC1 and OC2 can also be arranged between the liquid crystal cell 70 and the second polarization filter 31c. Moreover, the first and second optical compensation members OC1 and OC2 can also be separately arranged on the incidence side and the emission side of the liquid crystal cell 70.

In the embodiments, retardation is compensated to improve a contrast in the ON state in which a voltage is applied to the liquid crystal layer 71, i.e., the light off state. However, retardation can also be compensated in an OFF state in which a voltage is not applied to the liquid crystal layer 71, i.e., a light on state.

In the liquid crystal cell 70 according to the embodiments, a microlens array including microlenses can be formed to be embedded in the first substrate 72a or the like in association with pixels. However, from a viewpoint of coincidence of divergence angles or the like of light beams passing through the liquid crystal cell 70 and the first and second optical compensation members OC1 and OC2 and the like, it is preferable to arrange the first and second optical compensation members OC1 and OC2 and other compensation elements at a post-stage of the liquid crystal cell 70.

In the projector 10 according to the embodiments, the light source device 21 includes the light source lamp 21a, the pair of lens arrays 21d and 21e, the polarization conversion member 21g, and the superimposing lens 21i. However, the lens arrays 21d and 21e, the polarization conversion member 21g, and the like can be omitted. The light source lamp 21a can be replaced with another light source such as an LED.

In the embodiments, after performing color separation for illumination light using the color separation optical system 23 and performing modulation of the respective colors in the light modulating unit 25, combination of images of the respective colors is performed in the cross dichroic prism 27. However, it is also possible to form images with a single liquid crystal panel, i.e., the liquid crystal light valve 31.

In the embodiments, only the example of the projector 10 employing the three liquid crystal panels 25a to 25c is cited. However, the invention is also applicable to a projector employing two liquid crystal panels or a projector employing four or more liquid crystal panels.

In the embodiments, only the example of the front-type projector that projects light from a direction in which a screen is observed is cited. However, the invention is also applicable to a rear-type projector that projects light from a side opposite to the direction in which the screen is observed.

The entire disclosure of Japanese Patent Application Nos. 2007-076113, filed Mar. 23, 2007 and 2008-060673, filed Mar. 11, 2008 are expressly incorporated by reference herein.

What is claimed is:

1. A projector comprising:
    an optical modulator including a liquid crystal cell that includes a liquid crystal operating in a twist nematic mode, a first optical element formed of an optical material having positive uniaxiality, a second optical element formed of an optical material having positive uniaxiality, a third optical element that includes at least one optical film formed of an optical material having a refractive index anisotropy, and a pair of polarization elements between which the liquid crystal cell and the first to third optical elements are disposed;
    an adjustment mechanism that makes it possible to adjust an optical azimuth of a first group, which has at least one of the first optical element, the second optical element, and at least one optical film included in the third optical element, with respect to a fixed optical azimuth of a second group as a remainder excluding any element included in the first group among the first to third optical elements, the first and second groups being disposed on a same side of the liquid crystal cell;
    a light source that generates light for illuminating the optical modulator; and
    a projection optical system that projects the light that has passed through the optical modulator,
    the first and second optical elements having thicknesses for cooperating to effectively cancel components in a plane parallel to the incidence surface and the emission surface in liquid crystal retardation due to a liquid crystal present near the incidence surface and the emission surface in the liquid crystal cell, and
    the third optical element having a thickness for effectively canceling components in a direction perpendicular to the incidence surface and the emission surface in the liquid crystal retardation and canceling concomitant retardation concerning the direction perpendicular to the incidence surface and the emission surface due to the first and second optical elements.

2. The projector according to claim 1, wherein the first group has at least one optical film included in the third optical element.

3. The projector according to claim 1, wherein the first group is rotatable around an axis parallel to a system optical axis by the adjustment mechanism.

4. The projector according to claim 1, wherein the first optical element is included in the first group and the second optical element is included in the second group.

5. The projector according to claim 4, wherein, when a plurality of the optical films are included in the third optical element, the optical films included in the third optical element are distributed to the first and second groups such that a difference between a number of optical films included in the first group and a number of optical films included in the second group is minimized.

6. The projector according to claim 1, wherein the first optical element and the second optical element are included in one of the first group and the second group.

7. The projector according to claim 1, wherein the optical film included in the third optical element is a stretched film.

8. The projector according to claim 1, wherein the first and second optical elements are crystal plates, respectively.

9. The projector according to claim 1, wherein the adjustment mechanism includes:
    a first holder configured to hold the second group;
    a second holder configured to hold the first group; and
    a screw adjustment section configured to rotate the second holder with respect to the first holder.

* * * * *